United States Patent [19]

Gibson et al.

[11] 3,889,196

[45] June 10, 1975

[54] VHF AND UHF FIBER OPTIC CHANNEL INDICIA DISPLAY HAVING A COMMON DISPLAY AREA

[75] Inventors: Richard D. Gibson, Wilbraham; Robert D. Whelan, W. Springfield, both of Mass.

[73] Assignee: General Instrument Corporation, Clifton, N.J.

[22] Filed: Mar. 29, 1974

[21] Appl. No.: 455,985

[52] U.S. Cl.... 325/455; 116/124.1 R; 116/DIG. 26; 178/DIG. 2; 250/227; 334/87; 340/380; 350/96 B

[51] Int. Cl........................... G08b 5/36; H04b 1/06

[58] Field of Search........... 325/455, 458, 459, 464, 325/465; 178/DIG. 2; 334/86, 87; 250/227; 350/96 B; 340/380; 116/124.1 R, 124.1 A, DIG. 26, DIG. 29, DIG. 31

[56] References Cited

UNITED STATES PATENTS 3,639,747 2/1972 Schmidt.............................. 240/2.1

3,836,911 9/1974 Gibson et al........................ 340/380

*Primary Examiner*—Howard W. Britton

*Assistant Examiner*—Marc E. Bookbinder

[57] ABSTRACT

A channel indicia display for television receivers having both UHF and VHF tuning capability includes separate movable masking elements connected to be driven by the UHF and VHF tuner control shafts respectively. First and second fiber optic bundles are provided each of which has a light input end and a light output end. The light input end of each fiber optic bundle is located adjacent to a different one of the movable masks and the output ends are integrated and terminate in a common display window. Illuminating means are provided to illuminate each of the masks. Switch means associated with the VHF tuner control shaft are adopted to energize the appropriate illuminating means depending upon whether the receiver is tuned to receive a UHF or a VHF channel. A single display for similarly appearing numerals corresponding to both the VHF and UHF channels is thus provided.

16 Claims, 5 Drawing Figures

VHF AND UHF FIBER OPTIC CHANNEL INDICIA DISPLAY HAVING A COMMON DISPLAY AREA

The present invention relates to channel indicia display devices for television receivers and the like and more particularly to a channel indicia display device for use in a television receiver having both UHF and VHF capability which displays similar appearing numerals corresponding to both UHF and VHF channels at a single display area.

Conventional VHF channel indicia display devices normally utilize a direct viewing method due to the limited number of indicia which must be displayed. Indicia in the form of numerals are situated on a movable disc or drum which is driven as the VHF channel selector knob is rotated to bring the appropriate indicia in alignment with a display window. Because only twelve numerals, corresponding to the twelve VHF channels need be displayed, this direct viewing method has proven commercially acceptable as devices of this type require relatively little space in the receiver, can be manufactured of reliable and sturdy parts and are relatively inexpensive to produce.

Recently, however, the FCC has required that television receivers be manufactured with UHF reception mechanisms which are comparable in nature to the VHF reception mechanisms of the receiver. Expanding the reception capability of a television receiver to the UHF band in a manner comparable to the VHF mechanism has created numerous problems, not only relating to the tuner drive assemblies utilized to corporeally condition the UHF tuning element itself, but also with respect to channel indicia display devices which display the numeral corresponding to the UHF channel to which the receiver is tuned.

Many of these problems stem from the relatively large number of channels present in the UHF band. A UHF channel indicia display device must be capable of displaying 70 numerals, one for each of the UHF channels. The greater number of numerals which must be displayed renders impractical the use of direct viewing methods, such as those common in VHF displays. This is because a device utilizing the direct view method which is capable of displaying seventy different numerals of adequate size to be intelligible at an appreciable distance would necessarily require more space in the receiver than can be allotted this function. Although it is theoretically possible to reduce the size of the numerals and utilize a magnification lens or the like, this method has proved impractical due to the cost associated with magnifying lenses capable of performing the function adequately.

Perhaps the most suitable solution to this problem is to utilize a fiber optic type display device to display numerals corresponding to the UHF channels. Such devices are compact, relatively inexpensive and can display a great number of indicia of adequate size. The devices conventionally utilize a fiber optic bundle having an input end situated near a light source, and an output end located at a display window. A movable mask is interposed between the light source and the input end of the fiber optic bundle. The mask is operably connected with the UHF control shaft so as to be moved as the shaft is rotated. The mask is designed to prevent light from entering the input end of certain fibers and permit light to enter the input ends of other fibers. The output ends of the illuminated fibers illuminate certain points on the display window which form the numeral corresponding to the UHF channel to which the receiver is tuned. Rotation of the control shaft causes movement of the mask which in turn causes a different set of fibers to be illuminated to create a different numeral to be displayed.

The previously described technology can be utilized on the VHF tuner to create a similar type display, thus fulfilling the FCC requirement of the display compatability. The FCC requires that the UHF tuning controls and channel readout on a given receiver shall be comparable in size, location, accessibility and legibility to the VHF tuned controls and readout of that receiver. In addition to the desires of display compatability, the set manufacturer often desires to have the UHF and VHF display coincident.

It is, therefore, a prime object of the present invention to provide a channel indicia display device for use in a television having VHF and UHF reception capability wherein the UHF and VHF channel indicia are displayed in a common display area with numerals that are identical in appearance.

It is a further object of the present invention to provide a channel indicia display wherein the UHF and VHF indicia are transmitted by means of separate fiber optic bundles which have their output ends integrated at a single display window.

It is another object of the present invention to provide a UHF and VHF indicia display which have the same inter-channel appearance.

It is a still further object of the present invention to provide a display where the numbers do not rotate with respect to the display window or each other and thus do not create misregistration problems.

It is still another object of the present invention to provide a display that has a wide viewing angle, can be read at increased distances, the display location being independent of the control shaft location, and the intensity and color of the numerals being optional.

In accordance with the present invention a channel indicia display device for use with a television receiver or the like having VHF and UHF tuning capability includes first and second movable indicia carrying elements which are drivingly connected to the UHF tuner control shaft and the VHF tuner control shaft, respectively. A pair of fiber optic bundles each having a light input end and a light output end are provided. The fiber optic bundle transmitting light for the VHF display has its light input end situated adjacent the indicia carrying element associated with the VHF tuner. In a similar manner, the fiber optic bundle transmitting light for the UHF display has its light input end situated adjacent the indicia carrying element associated with the UHF tuner. The fibers at the output end of each of the fiber optic bundles are arranged in a particular format and integrated into a single pattern at a common display window.

Illuminating means are associated with each of the indicia carrying elements such that light traveling through the respective indicia carrying elements will illuminate selected fibers in the bundle associated therewith thus causing the selected fibers to illuminate specific portions of the display window. The illuminated portions of the display window form a pattern representing the appropriate numeral. Switch means associated with the control shaft of the VHF tuner serve to energize the appropriate illuminating means depending upon whether the receiver is tuned to a UHF or a VHF channel.

In this manner, a compact, relatively inexpensive display mechanism made of sturdy and reliable parts is achieved which utilizes a single display window for both the VHF and UHF display. Further, since the numerals displayed corresponding to the VHF and the UHF bands are identical in appearance, a much more aesthetically pleasing effect is created than by conventional UHF and VHF display device combinations.

To the accomplishment of the above and to such other objects as may hereinafter appear, the present invention relates to a channel indicia display device for use in a television receiver having both UHF and VHF tuning capability as defined in the appended claims and as described in the specification, taken together with the accompanying drawings wherein like numerals refer to like parts and in which:

Figure 1:
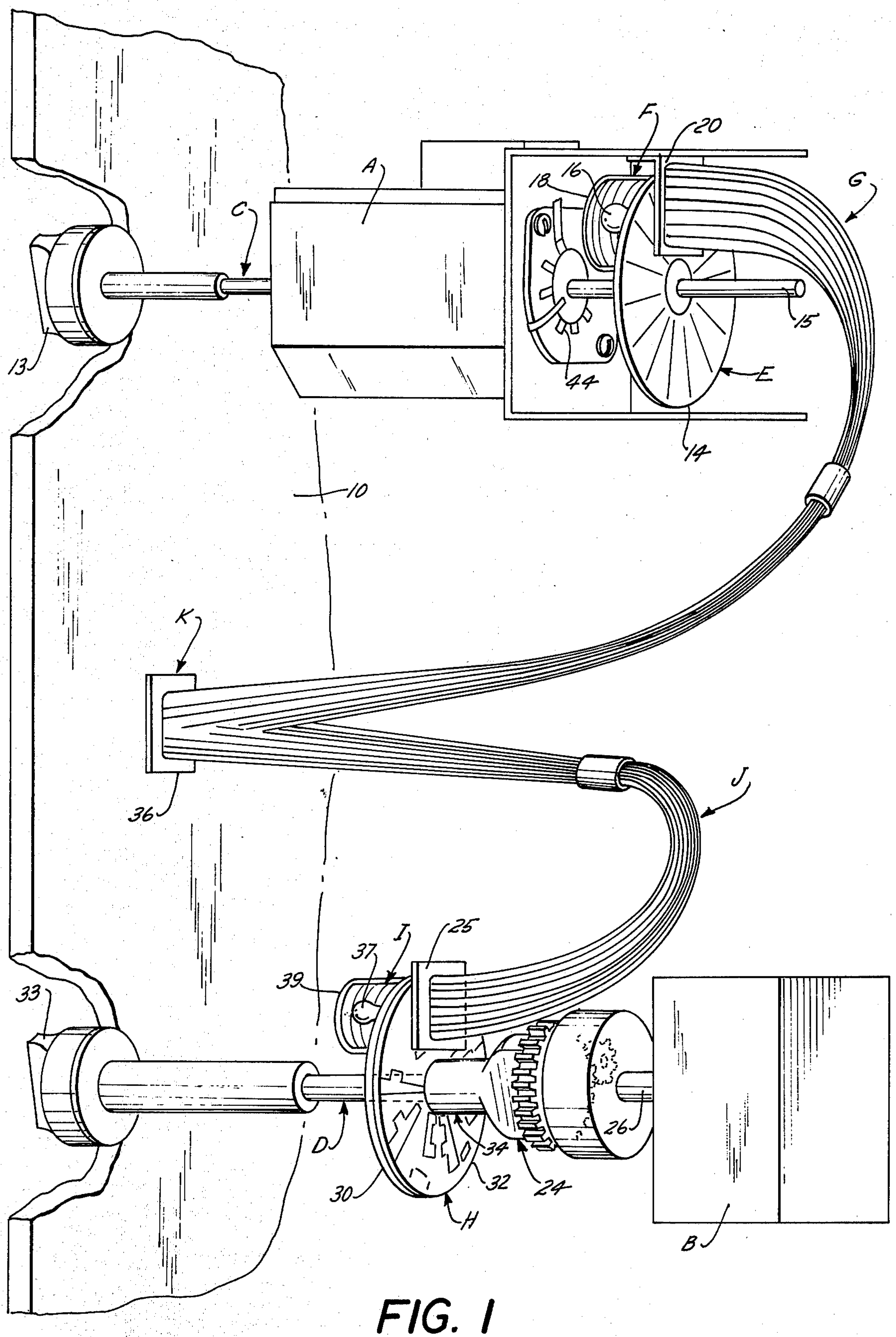
FIG. 1 is an isometric view of a preferred embodiment of the present invention.

The channel indicia display device of the present invention is primarily designed for use with a television receiver having both UHF and VHF reception capability. UHF and VHF tuning elements and their associated tuner drive assemblies take many forms and are well known in the art. As the UHF and VHF tuner elements and tuner drive assemblies associated therewith form no portion of the present invention, they are not herein illustrated or described in detail. The tuner elements are depicted in the drawings as situated in metallic enclosures as they are commonly provided in the industry. Therefore, the VHF tuning element is shown as being located in an enclosure generally designated A. Likewise, the UHF tuning element is depicted as being located in an enclosure generally designated B. A VHF tuner control shaft, generally designated C, is shown as extending to the exterior of the receiver enclosure and is utilized to manipulate the VHF tuner drive assembly to corporeally condition the VHF tuning element to select a single channel from the available channels in the VHF band. Likewise, a UHF tuner control shaft, generally designated D, is provided also extending to the exterior of the receiver enclosure. The rotation of control shaft D manipulates the UHF tuner drive assembly to corporeally condition the UHF tuning element to select a single UHF channel from the channels in the UHF band.

A portion of shaft C extends from the rear of enclosure A and has mounted thereon an indicia carrying element, generally designated E. A source of illumination, generally designated F, is situated on one side of element E and the light input end of a fiber optic bundle, generally designated G, is situated on the other side. A second indicia carrying element, generally designated H, is associated with the UHF tuner. A second illuminating means I is situated on one side of indicia element H and on the other side is located the input end of a second fiber optic bundle, generally designated J. The output ends of each of the fiber optic bundles G and J are located in an integrated fashion in a display window generally designated K.

As can be seen in FIG. 1, control shaft C extends from the VHF tuner drive assembly (not shown) through the front of the front panel 10 of the receiver enclosure. In the front of panel 10, control shaft C is provided with a control knob 13 to facilitate manipulation thereof. An extended portion 15 of shaft C protrudes from the rear of enclosure A and has mounted upon it indicia carrying element E. Element E takes the form of a disc 14 which is preferably made of a standard photographic film which has been exposed to a master and then developed. However, discs of this type could be produced by hot stamping, silk screening, plating, or metal punching, all of these processes producing the desired results. Disc 14 is divided into a plurality of sectors of a circle, each sector being subdivided into a number of radial segments to provide a plurality of masking portions.

Figure 2:
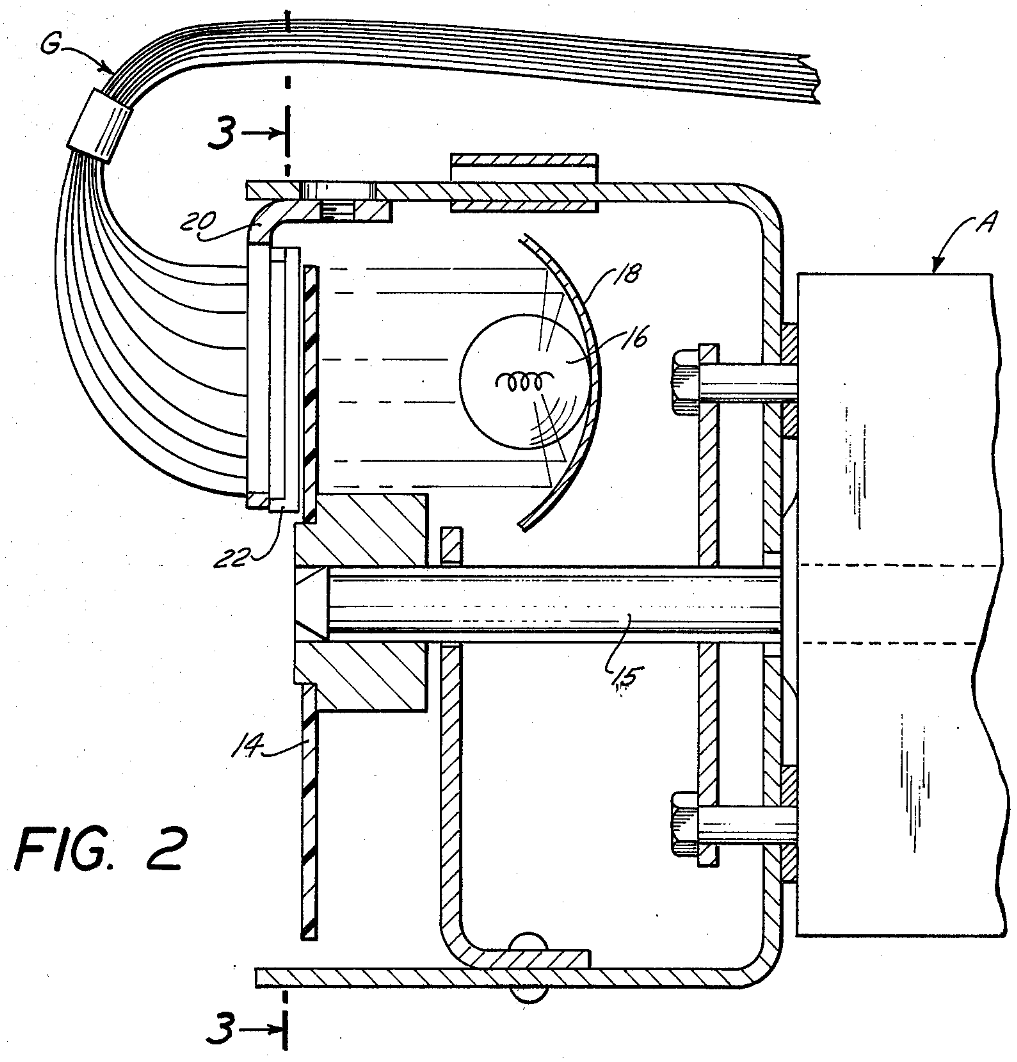
FIG. 2 is a side cut-away view of the rear portion of the VHF tuner shown in FIG. 1.

Situated between disc 14 and the rear portion of enclosure A is illuminating means F which takes the form of a light bulb 16 and a parabolic reflector 18. Reflector 18 causes the light from bulb 16 to be directed toward mask 14 in a collimated beam perpendicular to the surface thereof. This is best shown in FIG. 2. Situated directly in the path of collimated light from illuminating means F, but on the opposite side of disc 14, is bracket 20 which holds the input ends of the fibers of fiber optic bundle G which may be encased in a medium 22 such as plastic.

Figure 4:
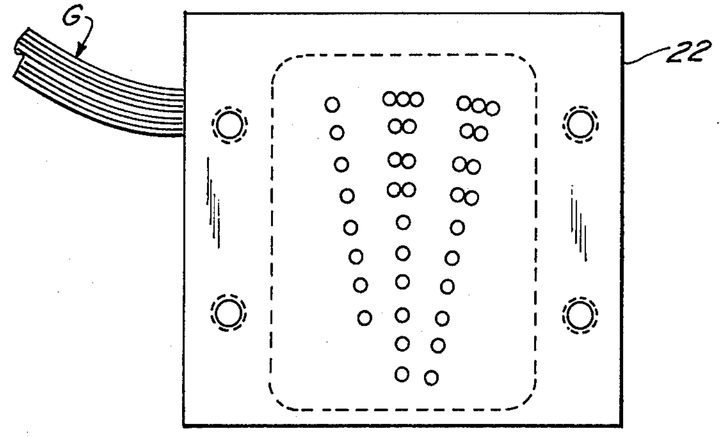
FIG. 4 is a front view showing the arrangement of the input ends of the fiber optic bundle associated with the VHF tuner in a preferred form of the present invention.
Figure 3:
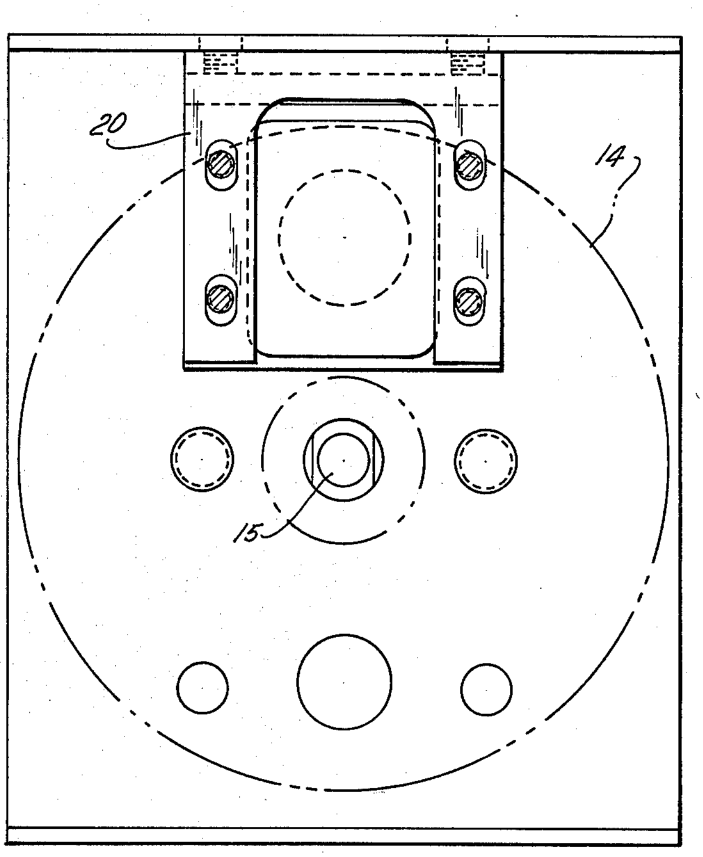
FIG. 3 is a rear view along lines 3—3 of the portion of the invention shown in FIG. 2.

As can be seen from FIG. 4, the input ends of the fibers in fiber optic bundle G are arranged in three radially extending columns each comprised of a plurality of groups of one or more fibers. Each of the columns corresponds in form to a masking sector on disc 14. Each of the groups of fibers which make up a column is situated in alignment with one of the radial segments which make up the sectors on disc 14. The output ends of the fibers of fiber optic bundle G terminate in display window K.

In FIG. 4, fiber optic bundle G is shown as being comprised of 38 fibers arranged in three columns. The left hand column of fibers provides the tens digit for the VHF display while the remaining two columns provide the units digit for the VHF display. Only a single column of fibers is necessary to provide a tens digit because in the VHF display the tens digit can only be blank or one. Thus, eight fibers are utilized for the tens digit and 30 fibers for the units digit, which may be any of the numerals zero through nine.

In operation, illuminating means F sends a collimated beam of light through the sectors of disc 14 aligned with bracket 20. The sectors each comprise a plurality of radial segments which are either transparent or opaque. Those segments which are opaque prevent light from passing to the input ends of the fibers in fiber optic bundle G aligned therewith. On the other hand, the input end of certain of the fibers are illuminated because the light passes through those radial segments which are transparent. The fibers in optic fiber bundle G whose input ends are illuminated transmit the light to display window K in a manner well known in the art. The output ends of the fibers of fiber optic bundle G are arranged in a predetermined pattern at display window K. By illuminating the input ends of selected fibers, the output ends of those illuminated fibers in turn illuminate selected points at display window K. Those illuminated points on display window K form a pattern which is recognizable as the numeral corresponding to the VHF channel selected. When control shaft C is rotated to select another channel, disc 14 is rotated, thus bringing different sectors in alignment with the input end of fiber optic bundle G. These different segments permit the input ends of different fibers to be illuminated, thus changing the pattern of light transmitted to display window K and forming the numeral which corresponds to the newly selected channel.

The portion of the channel indicia display device of the present invention which produces numerals corresponding to UHF channels is slightly more complicated than the previously described VHF portion because of the much greater number of numerals which must be displayed. Such a device is described in detail in application Ser. No. 379,212 entitled "Coding Arrangement For Fiber Optic Digital Display Device", filed July 16, 1973 in the names of Richard D. Gibson and Robert D. Whelan now U.S. Pat. No. 3,836,911 and assigned to the assignee of the present invention.

Briefly, the UHF channels are selected by means of rotating UHF selector shaft D. Shaft D is operably connected to the UHF tuner element and drive assembly located in enclosure B. An intermittent gear system 24 of conventional design is connected to the UHF tuner drive mechanism by means of shaft 26 which is a portion of selector shaft D. Indicia carrying element H is located between the front panel 10 of the receiver and gear system 24. The indicia carrying elements are controlled for the channel readout system by utilizing the intermittent gear arrangement. The readout system works by rotating the units digit element in direct correspondence with the selected shaft movement. Each revolution of the selector shaft turns a coaxial shaft 34 one position through the intermittent gear system 24. This second shaft is used to control the element that displays the tens numeral.

Indicia carrying element H comprises two discs 30 and 32 each of similar nature disc 14. Discs 30 and 32 control the units and tens indications respectively for the UHF display, are individually rotatable about a common axis and are situated immediately adjacent each other. Each of the discs has a plurality of masking sectors situated on the surface thereof similar to those on disc 14. Preferably, each of the discs 30, 32 is divided into 10 36° sectors, 18° being actively used for masking and the other half of the sector being passively transparent. The transparent sectors are used as windows to transmit light to the adjacent disc. Each 18° masking subsector is broken into a plurality of radial segments to correspond to each of the groups of fibers at the input end of fiber optic bundle J.

Disc 32 is connected to the gear system 24 by means of shaft 34. Disc 30 is mounted on shaft D which extends beyond the front panel 10 and is connected to a selector knob 33. Gear system 24 functions to move disc 32 through an arc of 36° each time disc 30 rotates through an arc corresponding to ten channels, preferably a complete 360° rotation.

The input end of fiber optic bundle J is held by a bracket 25 situated in alignment with a portion of element H, is arranged within a 36° sector of a circle and aligned with a 36° sector of element H. Preferably, fiber optic bundle J contains enough fibers to produce two separate numerals, the tens digit and a units digit at display window K. The input end of the fibers which will produce the units digit are aligned with one of the 18° mask subsectors of disc 30 and the input end of the fibers which will produce the tens digit are aligned with the 18° mask subsector of disc 32 immediately adjacent to it.

Masks 30 and 32 are rotatably offset by 18°. Hence, each 18° masking subsector of each disc 30, 32 will always be aligned with the 18° transparent subsector of the other mask. In this way, each mask is active on one-half of the 36° sector of the input end of fiber optic bundle J. The light from illumination means I, which consists of a bulb 37 and a parabolic reflector 39 similar to illuminating means F, will pass through one of the 18° mask active subsectors in disc 30 and the immediately adjacent 18° mask active subsector in disc 32 simultaneously, thus illuminating selected fibers in fiber optic bundle J in a manner similar to that described above, such that both the tens digit and the units digit of the number corresponding to the UHF channel selected may appear at display window K.

Figure 5:
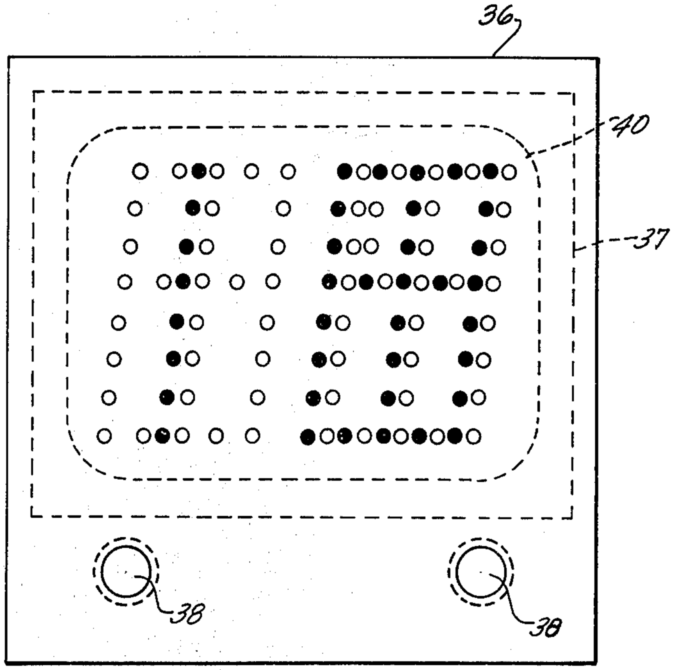
FIG. 5 is a front view of the display window of the present invention showing the arrangement of the output ends of the fiber optic bundles.

Display window K is shown in detail in FIG. 5. Display window K comprises an opaque black solid plastic medium 36 with a plurality of holes into each of which a different one of the output ends of the optical fibers is adhered. A diffusion screen 37 is provided over medium 36 to achieve a wide viewing angle. The subassembly is then affixed to the tinted front panel 10 of the television receiver by any conventional method such as screws 38. The area of panel 10 not used as the viewing area is painted with an opaque material for aesthetic purposes. This defines section 40 as the viewing area. In FIG. 5, section 40 is shown as a rectangle with rounded corners but any shaped section may be utilized as long as it is large enough to permit visibility of the output ends of the fiber optic bundles. Black plastic is used for the receiver to provide a good contrast between the lighted fibers and the body of the receiver.

The output ends of the fibers are situated in medium 36 in a predetermined pattern. The fibers from each of the bundles G and J are separated into two subpatterns, one of which will form the units digit and the other of which will form the tens digit for each of the VHF and UHF displays respectively. In FIG. 5 the output ends of the fibers in fiber optic bundle G are shown by shaded dots whereas the output ends of the fibers from fiber optic bundle J are shown as nonshaded dots. The subpattern which forms the tens digit for the VHF display is shown as a single column of shaded dots whereas the tens subpattern is shown as three rows intersected by three columns of shaded dots. For the UHF display, both the units and the tens are shown as three rows intersected by three columns of nonshaded dots. If desired, the vertical columns of fibers may be slanted for aesthetic reasons. Further, the output ends of the fibers may be spread out to achieve an apparent magnification of the numerals displayed.

The tens subpatterns for both the VHF and UHF displays are integrated on the face of display window K. In a similar manner, the units subpatterns for both the VHF and UHF displays are integrated on the face of display window K.

More specifically, the patterns are integrated on the display window by locating the corresponding output ends of the fibers from each bundle closely adjacent one another. The output ends from one bundle are, in fact, disposed between the rows and columns of the other set such that they are adjacent corresponding fiber ends. Thus, the patterns are offset approximately half the distance between the output ends of adjacent fibers in the patterns. In the tens digit, the single line representing the VHF tens digit is offset from but adjacent to the central line of the UHF tens digit subpattern. In the units digit, the subpatterns are slightly offset such that the corresponding fibers from each subpattern are immediately adjacent each other. The numerals corresponding to the VHF channels and the numerals corresponding to the UHF channels are similar in appearance because they are produced by the same method. Further, because the output ends of the rows of fibers from one bundle are interspersed between the output ends of the rows of fibers from the other bundle, there is a slight shift of the displayed numerals relative to the display window as the tuner is changed from one band to the other. However, due to the close spacing of the fiber output ends, the slight shift which occurs between changing bands is almost imperceptible. Thus, since the numerals from each of the bands are displayed on the same field in almost identical locations, visual continuity is present between displays. By illuminating selected fibers in one or the other of the bundles, the appropriate areas of display window K are illuminated thus forming a pattern representative of the channel selected. If desired, a diffused screen, which may form a portion of transparent section 40 or medium 36 may be utilized in conjunction with the fiber optics display.

Referring again to FIG. 1, a rotary selector switch 44, of conventional design, is provided operably connected to shaft 15 to be driven thereby. Selector switch 44 controls the energization of illuminating means F and I. Normally the VHF selector is provided with 13 positions, one for each of the twelve VHF channels and a position for the UHF channels. When a channel in the VHF spectrum is selected, switch 44 is positioned by shaft 15 to energize illuminating means F and de-energize illuminating means I. When selector shaft 15 is rotated to the position corresponding to the UHF position, selector switch 44 de-energizes illuminating means F and energizes illuminating means I. Thus, when a VHF channel is selected the VHF portion of the channel indicia display device is active and the UHF portion is inactive. Likewise, when a UHF channel is selected, the VHF portion is inactive and the UHF portion active.

Since the fiber optic bundles G and J are relatively flexible, display window K may be placed anywhere on front panel 10. This versatility provides the receiver designer with the option of placing display window K in a position which is not only aesthetically pleasing but also readily visible. Moreover, the UHF and VHF tuning mechanisms need not be situated in any particular arrangement with respect to each other and the display window. Thus, the VHF portion of the mechanism may be situated above the UHF portion as shown in FIG. 1 or vice versa.

It should be noted that the particular coding arrangements, number of fibers in the fiber optic bundles and arrangement of the opaque and transparent segments on the indicia carrying elements form no portion of the present invention and may be modified or changed to suit the particular requirements of the user. While but a single embodiment of the present invention has been here specifically disclosed for purposes of illustration, it is apparent that many variations and modifications may be made therein. It is intended to cover all of these variations and modifications which fall within the scope of the invention as defined by the following claims.

We claim:

1. A channel indicia display for television receivers or the like having first and second frequency band tuners and separate movable control shafts adapted to respectively condition the tuners, the display comprising first and second movable indicia carrying elements each of which is operably connected to a different one of said control shafts to be driven thereby, a display window, first light transfer means for optically connecting said first indicia carrying element with said display window and second light transfer means for optically connecting said second indicia carrying element with said display window, each of said first and said second light transfer means having an output end adjacent said display window, said output ends of said means being integrated at said display window so as to form a single display.

2. The display of claim 1 further comprising first illumination means for illuminating the input end of said first light transfer means to cause said first light transfer means to optically connect said first indicia carrying element with said display window and second illumination means for illuminating the input end of said second light transfer means to optically connect said second indicia carrying element with said display window.

3. The display of claim 2 further comprising switch means operably connected to one of said control shafts for energizing one of said first and said second illumination means in accordance with the position of the shaft to which it is connected.

4. A channel indicia display for television receivers or the like having first and second frequency band tuners and separate movable control shafts adapted to respectively condition the tuners, the display comprising first and second movable indicia carrying elements each of which is operably connected to a different one of said control shafts to be driven thereby, a display window, first and second fiber optic bundles each having a light input end and a light output end, the light input end of said first bundle being positioned proximate to said first indicia carrying element and the light output end of said first bundle being positioned adjacent said display window, the light input end of said second bundle being positioned proximate to said second indicia carrying element and said light output end of said second bundle being positioned adjacent said display window, the fibers at the output end of each bundle being arranged in a pattern, the pattern formed by the output end of one bundle being integrated at said display window with the pattern formed by the output end of the other bundle so as to form a single display.

5. The display of claim 4 wherein each pattern is divided into first and second subpatterns.

6. The display of claim 5 wherein the first subpatterns of each bundle are integrated with each other and said second subpatterns of each bundle are integrated with each other.

7. The display of claim 6 wherein the first and second subpatterns of one of said bundles comprises three rows of fibers intersecting three columns.

8. The display of claim 7 wherein the second subpattern of said other bundle comprises three rows of fibers intersecting three columns.

9. The display of claim 8 wherein the first subpattern of said other bundle is a single column of fibers.

10. The display of claim 4 wherein the output ends of the fibers from one bundle are closely adjacent the corresponding output ends of the fibers from the other bundle.

11. The display of claim 4 wherein the output ends of the fibers from one bundle are disposed in the spaces between adjacent corresponding output ends of the fibers in the other bundle.

12. The display of claim 4 wherein the patterns are offset by a distance which is approximately half the distance between adjacent output ends of the fibers.

13. The display of claim 5 wherein the first and second subpatterns of one of said bundles comprises three rows of fibers intersecting three columns.

14. The display of claim 13 wherein the second subpattern of said other bundle comprises three rows of fibers intersecting three columns.

15. The display of claim 14 wherein the first subpattern of said other bundle is a single column of fibers.

16. The display of claim 15 wherein said single vertical column is offset from the central column of the first subpattern of said one of said bundles and spaced between said central column and an adjacent column of said first subpattern.

* * * * *